US012716821B2

(12) United States Patent
Oh et al.

(10) Patent No.: US 12,716,821 B2
(45) Date of Patent: Aug. 25, 2026

(54) APPARATUS FOR MEASURING SEALING STRENGTH

(71) Applicant: SK On Co., Ltd., Seoul (KR)

(72) Inventors: Won Je Oh, Daejeon (KR); Sang Mo Kim, Daejeon (KR); Taek Eon Jeong, Daejeon (KR); Sun Min Park, Daejeon (KR); Jae Gyu Byun, Daejeon (KR); Gi Jeong Seo, Daejeon (KR); Seung Won Choi, Daejeon (KR)

(73) Assignee: SK On Co., Ltd., Seoul (KR)

( * ) Notice: Subject to any disclaimer, the term of this patent is extended or adjusted under 35 U.S.C. 154(b) by 413 days.

(21) Appl. No.: 18/214,828

(22) Filed: Jun. 27, 2023

(65) Prior Publication Data

US 2024/0175792 A1 May 30, 2024

(30) Foreign Application Priority Data

Nov. 24, 2022 (KR) ........................ 10-2022-0159615

(51) Int. Cl.
*G01N 3/08* (2006.01)
*G01N 19/04* (2006.01)

(52) U.S. Cl.
CPC ............... *G01N 3/08* (2013.01); *G01N 19/04* (2013.01); *G01N 2203/0091* (2013.01)

(58) Field of Classification Search
CPC .. G01N 3/08; G01N 2203/0091; G01N 19/04; H01M 10/48; H01M 50/105; Y02E 60/10
See application file for complete search history.

(56) References Cited

U.S. PATENT DOCUMENTS 3,019,644 A * 2/1962 Mancini ................. G01N 19/04 73/827
7,628,066 B2 * 12/2009 Deng ....................... G01N 3/24 73/827
2008/0202254 A1 * 8/2008 Deng ..................... G01N 19/04 73/827

(Continued)

FOREIGN PATENT DOCUMENTS

CN 112033899 A * 12/2020 ............. G01N 19/04
KR 100866895 B1 11/2008

(Continued)

OTHER PUBLICATIONS

Devries et al., “Adhesion Science and Engineering”, Chapter 6—Mechanical testing of adhesive joints, vol. 1, 2002, pp. 193-234, <https://doi.org/10.1016/B978-0-444-51140-9.50033-0> (Year: 2002).*

(Continued)

*Primary Examiner* — Jonathan M Dunlap
(74) *Attorney, Agent, or Firm* — The Webb Law Firm

(57) ABSTRACT

Proposed is an apparatus for measuring sealing strength. The apparatus includes a fixed plate, a moving plate on which a measurement object formed by bonding first and second specimens is mounted, and movably disposed on the fixed plate, and a load applier measuring a load applied to the first specimen to peel off the first specimen from the second specimen. The first specimen is peeled off from the second specimen while maintaining a predetermined peeling angle.

8 Claims, 6 Drawing Sheets

(56) References Cited

U.S. PATENT DOCUMENTS

2015/0330884 A1 * 11/2015 Spinella .................. G01N 3/24
73/827

FOREIGN PATENT DOCUMENTS

KR 101141720 B1 5/2012
KR 102039526 B1 11/2019

OTHER PUBLICATIONS

Jaipal, Yuvraj. "PT190—90 degree Peel Test Attachment with moving Base Sledge", The Testing Times, Jul. 17, 2013, <https://thetestingtimes.blogspot.com/2013/07/pt190-90-degree-peel-test-attachment_17.html> (Year: 2013).*

* cited by examiner

APPARATUS FOR MEASURING SEALING STRENGTH

CROSS REFERENCE TO RELATED APPLICATION

This application claims priority to Korean Patent Application No. 10-2022-0159615, filed Nov. 24, 2022, the disclosure of which is hereby incorporated by reference in its entirety.

BACKGROUND OF THE INVENTION

1. Field of the Invention

The present disclosure relates generally to an apparatus for measuring sealing strength and, more particularly, to an apparatus for measuring sealing strength between a pouch casing and electrode tabs of a pouch-type secondary battery.

2. Description of Related Art

In general, secondary batteries are batteries which can be repeatedly charged and discharged. The secondary batteries are widely used as power sources with output characteristics and stability for electric vehicles (EVs), hybrid vehicles (HEVs), and energy storage systems (ESSs).

Depending on the shape of an outer casing in which an electrode assembly is accommodated, the secondary batteries may be classified into a cylinder type, a prismatic type, and a pouch type. Recently, the demand for thin pouch-type secondary batteries has been increased.

Referring to FIGS. 1 and 2, a pouch-type secondary battery 100 includes an electrode assembly 110, a pouch casing 120 for accommodating the electrode assembly 110 and an electrolyte solution, and electrode tabs 130 electrically connected to the electrode assembly 110 and extending to the outside. In order to seal the electrode assembly 110 and the electrolyte solution inside a pouch, a sealing portion 121 is formed on an outer edge of the pouch casing 120 made of an aluminum laminate sheet by a bonding method such as thermal fusion.

The pouch casing 120 may include: the sealing portion 121 forming an inner space with ends of the electrode tabs 130 extending to the outside, and formed by facing an upper pouch **120*a* surrounding an upper side of the electrode assembly 110 and a lower pouch 120*b* surrounding a lower side of the electrode assembly 110 and then sealing edges of the upper and lower pouches 120*a* and 120*b* by thermal fusion; and an accommodating portion 122 providing an inner space for accommodating the electrode assembly 110 and the electrolyte solution between the upper pouch 120*a* and the lower pouch 120*b* disposed spaced apart from each other inside the sealing portion 121**.

As described above, the pouch-type secondary battery 100 is sealed with the electrode tabs 130 inserted between the upper pouch **120*a* and the lower pouch 120*b*. Since the bonding between the pouch casing 120 and the electrode tabs 130 is achieved by heterogeneous bonding of a polymer and a metal, the junction between the pouch casing 120 and the electrode tabs 130** may have relatively weak sealing strength compared to other sealing portions.

Due to this disadvantage, when the internal pressure increases as gas is generated inside the pouch-type secondary battery 100, the pouch casing 120 may expand in the direction A as illustrated in FIG. 2 and be peeled off from the electrode tabs 130. For this reason, it is required to provide a secondary battery in which a pouch casing is not easily peeled off from electrode tabs and has increased bonding reliability at a heterogeneous junction between the pouch casing and the electrode tabs.

Therefore, there is a need for a means for measuring the adhesive sealing strength of the pouch casing with respect to the electrode tabs.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to quantitatively measure sealing strength through a 90° peel test for a measurement object, which is a bonding material.

In order to achieve the above objective, according to one aspect of the present disclosure, there is provided an apparatus for measuring sealing strength, the apparatus including: a fixed plate; a moving plate on which a measurement object formed by bonding first and second specimens is mounted, and movably disposed on the fixed plate; and a load applier measuring a load applied to the first specimen to peel off the first specimen from the second specimen. Here, the first specimen may be peeled off from the second specimen while maintaining a predetermined peeling angle.

The moving plate may be disposed on the fixed plate to be movable in a horizontal direction.

The load applier may be disposed above the moving plate to be movable in a vertical direction.

The load applier may include: a load measuring device moved in a vertical direction; and a jig coupled to the load measuring device and holding an end of the first specimen.

An imaginary straight line connecting a holding point of the jig and a peeling point of the first specimen may be orthogonal to an upper surface of the moving plate.

The fixed plate may be provided with a guide rail on an upper surface of the fixed plate, and the moving plate may have a rail groove movably coupled to the guide rail on a lower surface of the moving plate.

The guide rail and the rail groove may be oriented along a peeling direction of the first specimen.

The apparatus may further include a clamp provided on the moving plate and clamping or unclamping the measurement object.

The clamp may include a pair of clamps that are disposed spaced apart from each other along a peeling direction of the first specimen so as to clamp opposite ends of the measurement object.

The first specimen may be provided as a pouch casing, and the second specimen may be provided as an electrode tab.

The features and advantages of the present disclosure will be more clearly understood from the following detailed description when taken in conjunction with the accompanying drawings.

All terms or words used in the specification and claims have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As is apparent from the above description, the present disclosure can quantitatively measure sealing strength through a peel test for a measurement object, which is a bonding material.

In particular, the present disclosure can enhance reliability of measurement results by measuring sealing strength at a peeling angle of 90°, which is set according to the peeling situation between electrode tabs and a pouch casing occurring when the pouch casing expands as internal pressure of a pouch-type secondary battery increases.

The apparatus for measuring sealing strength according to the present disclosure has a simple structure and can easily measure sealing strength.

BRIEF DESCRIPTION OF THE DRAWINGS

The above and other objectives, features, and other advantages of the present disclosure will be more clearly understood from the following detailed description when taken in conjunction with the accompanying drawings, in which.

DESCRIPTION OF THE INVENTION

Figure 1:
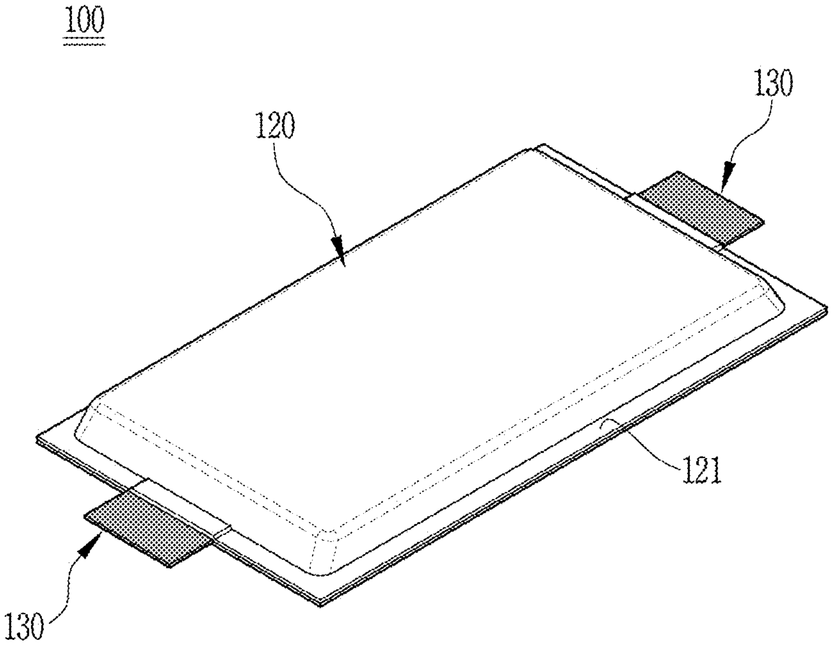
FIG. 1 is a perspective view illustrating a pouch-type secondary battery.

The objectives, advantages, and features of the present disclosure will be more clearly understood from the following detailed description and embodiments when taken in conjunction with the accompanying drawings, but the present disclosure is not necessarily limited thereto. Further, in the following description of the present disclosure, a detailed description of related known configurations or functions may be omitted to avoid obscuring the subject matter of the present disclosure.

The embodiments described herein and the accompanying drawings are not intended to limit the present disclosure to specific embodiments. It should be understood that the present disclosure covers various modifications, equivalents, and/or alternatives of the embodiments.

As for reference numerals associated with elements in the drawings, the same or similar reference numerals refer to the same or similar elements throughout the drawings.

It will be understood that, although the terms "first", "second", and the like may be used only to distinguish one element from another element, these elements should not be limited by these terms. In the drawings, some elements are exaggerated, omitted, or schematically illustrated, and the size of each element does not exactly reflect its real size.

As is well known in the art, a pouch-type secondary battery includes a sealing portion formed by facing and bonding edges of an upper pouch and a lower pouch together by various bonding methods (e.g., thermal fusion). A first end of each electrode tab is electrically connected to an electrode assembly inside a pouch casing, and a second end of each electrode tab is exposed to the outside of the pouch casing. To this end, the pouch-type secondary battery has a structure in which electrode tabs are interposed between the edge of the upper pouch and the edge of the lower pouch.

Due to such structural characteristics, in order to increase the sealing properties of the pouch casing and at the same time to secure electrical insulation, it is required for the pouch-type secondary battery to provide reliable sealing strength to the junction between the pouch casing and the electrode tabs, more specifically, the junction between the upper pouch and the electrode tabs and the junction between the lower pouch and the electrode tabs.

Therefore, it is required to measure the sealing strength of the pouch casing with respect to the electrode tabs.

Hereinbelow, an embodiment of the present disclosure will be described in detail with reference to the accompanying drawings.

Figure 3:
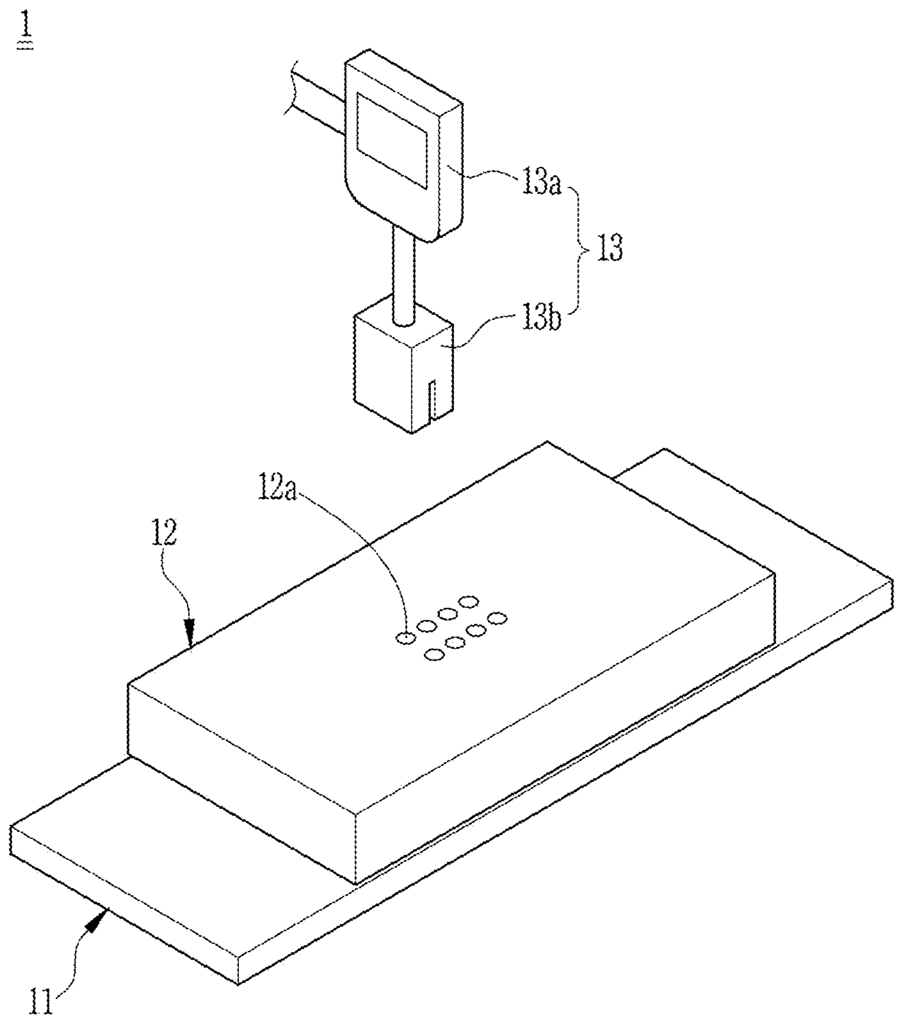
FIG. 3 is a perspective view schematically illustrating an apparatus for measuring sealing strength according to an embodiment of the present disclosure.

As illustrated in FIG. 3, an apparatus 1 for measuring sealing strength according to an embodiment of the present disclosure can quantitatively measure sealing strength of a specimen through a peel test for the specimen. Here, a measurement object S (see FIGS. 4A and 4B) is formed by bonding a first specimen S1 corresponding to a pouch casing and a second specimen S2 corresponding to an electrode tab, and may be a sealing portion through which electrode tabs of a pouch-type secondary battery extend to the outside. The measurement object is not limited to the sealing portion through which the electrode tab extends to the outside, and may be a laminate implemented with a bonding material.

Figure 4A:
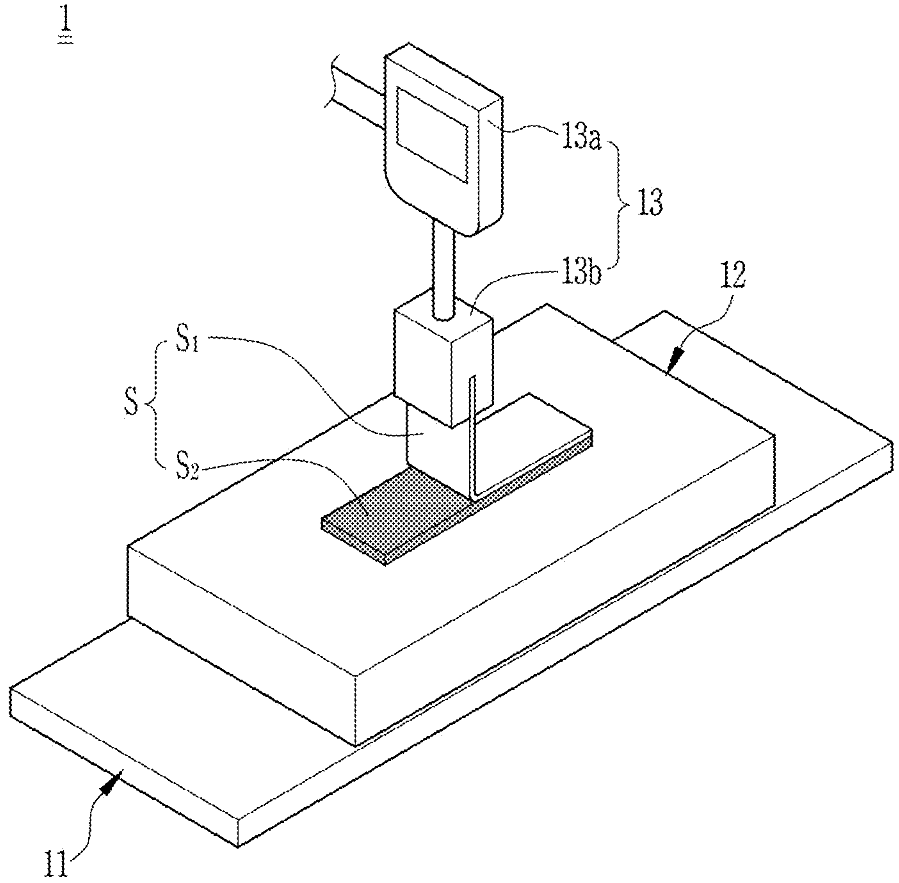
FIG. 4A is a view illustrating a state in which a measurement object is mounted on the apparatus for measuring sealing strength according to the present disclosure.
Figure 4B:
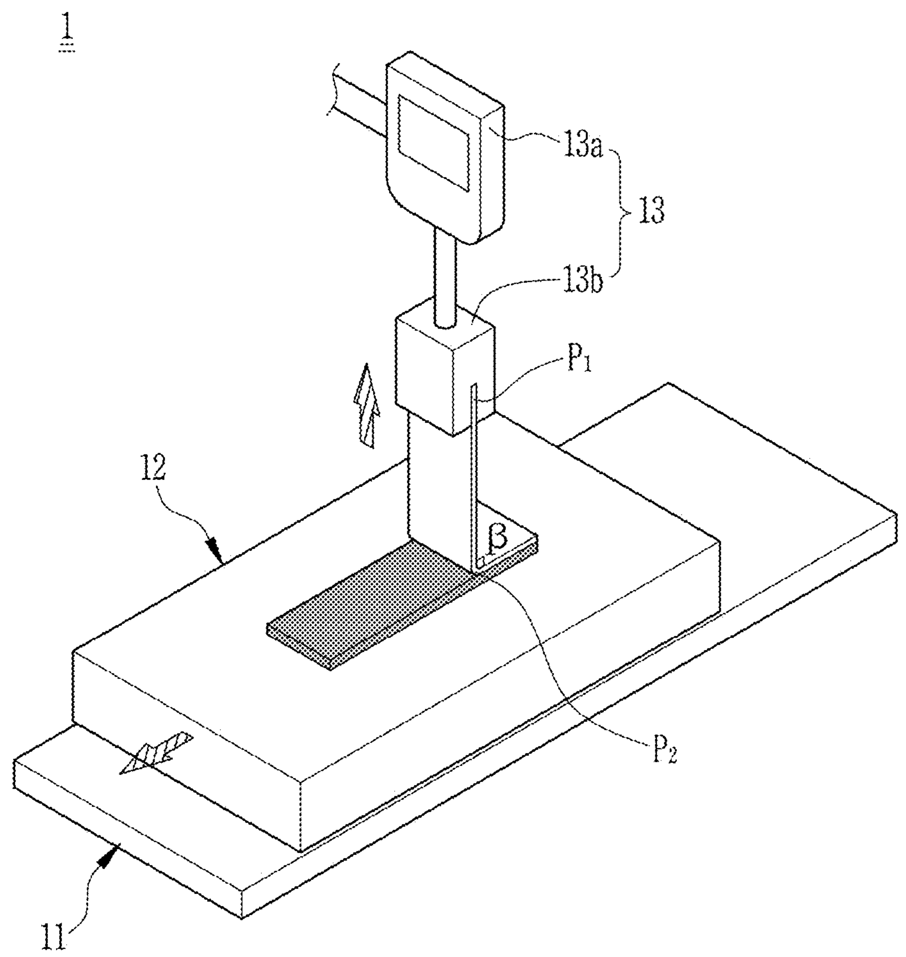
FIG. 4B is a view illustrating a state in which sealing strength of the measurement object is measured by the apparatus for measuring sealing strength according to the present disclosure.

Referring to FIGS. 3 to 4B, the apparatus 1 for measuring sealing strength according to the present disclosure includes a fixed plate 11, a moving plate 12 movably disposed on the fixed plate 11, and a load applier 13 for applying a load to the measurement object S fixed to the moving plate 12.

The fixed plate 11 provides a space for supporting members constituting the apparatus 1 according to the present disclosure.

As illustrated, the moving plate 12 has a plate shape. The moving plate 12 is movably disposed on the fixed plate 11 in the horizontal direction and the measurement object S is placed thereon. The measurement object S is a bonding material composed of the first specimen S1 and the second specimen S2 bonded to the first specimen S1.

Specifically, the measurement object S is mounted by fixing the second specimen S2 on the moving plate 12. To this end, the second specimen S2 of the measurement object S may be fixed in an adhesive manner by an adhesive member (not illustrated) disposed on an upper surface of the moving plate 12. The adhesive member may be an adhesive or double-sided tape for firmly adhering the second specimen S2 to the upper surface of the moving plate 12 while the first specimen S1 of the measurement object S is peeled off from the second specimen S2. Alternatively, a lower surface of the second specimen S2 may be fixed to the upper surface of the moving plate 12 in a vacuum manner. The moving plate 12 has a plurality of vacuum ports 12*a* on the upper surface thereof facing the second specimen S2. The vacuum ports 12*a* are connected to a vacuum pump (not illustrated). Therefore, the measurement object is disposed on the vacuum ports of the moving plate 12 and vacuum-adsorbed to the upper surface of the moving plate 12 by driving the vacuum pump.

Of course, the moving plate 12 may use various methods for clamping or unclamping the measurement object S.

The load applier 13 is disposed above the moving plate 12 to be movable in the vertical direction in order to peel off the first specimen S1 of the measurement object S from the second specimen S2.

As illustrated, the load applier 13 holds an end of the first specimen S1 and transfers the first specimen S1 in the vertical direction. The load applier 13 includes a load measuring device 13*a* disposed to be movable in the vertical direction relative to the upper surface of the moving plate 12, and a jig 13*b* coupled to the load measuring device 13*a*. The load measuring device 13*a* measures and displays a load applied to the first specimen S1 held by the jig 13*b* while being moved in the vertical direction, more specifically, in the vertical direction orthogonal to the upper surface of the moving plate 12 through precise control of a controller (not illustrated).

As is well known to those skilled in the art, a load measuring device is moved in the vertical direction by being connected to various driving mechanisms, in particular, it is moved in the vertical direction at a constant speed.

In other words, the load applier 13 measures sealing strength (adhesive force) measured by forcibly peeling off the first specimen S1 from the second specimen S2 using a load that pulls the first specimen S1 upward through the load measuring device 13*a*.

Figure 2:
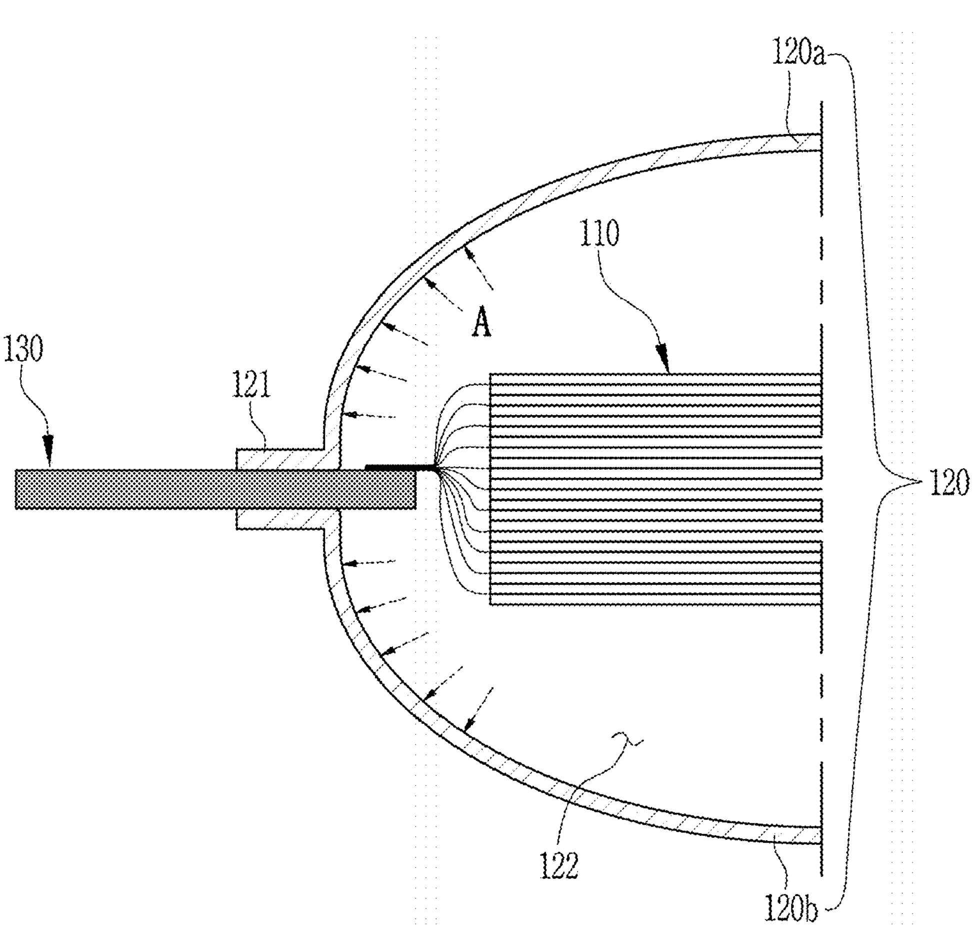
FIG. 2 is a sectional view schematically illustrating the pouch-type secondary battery illustrated in FIG. 1, illustrating a state in which internal pressure of the pouch-type secondary battery is increased.

In a pouch-type secondary battery 100, electrode tabs 130 are interposed and fused between an upper pouch 120*a* and a lower pouch 120*b* made of aluminum laminate sheets, with a lead film attached to outer surfaces thereof. When internal pressure of the pouch-type secondary battery 100 increases, a pouch casing 120 expands in the direction A and is peeled off from the electrode tabs 130 (see FIG. 2). Here, the upper pouch 120*a* and/or the lower pouch 120*b* are peeled off at a peeling angle of 90° from the electrode tabs 130. Since the apparatus 1 according to the present disclosure moves the moving plate 12 in response to the movement of the load applier 13, the first specimen S1 is peeled off while maintaining a predetermined angle β with respect to the second specimen S2.

Thus, the apparatus 1 according to the present disclosure reproduces a peel test for the first specimen S1 while maintaining a peeling angle β of 90° in the same manner as the peeling situation caused by expansion of the pouch casing 120 with respect to the electrode tabs 130.

That is, the sealing strength is measured while pulling the first specimen S1 from the second specimen S2 at a peeling angle β of 90°.

In addition, the load measuring device 13*a* for measuring the load applied by the load applier 13 may be provided as a load cell.

FIGS. 4A and 4B are schematic views sequentially illustrating a peeling process of the measurement object S using the apparatus 1 for measuring sealing strength according to the present disclosure.

FIG. 4A schematically illustrates the process of providing the measurement object S, which is a bonding material, to the apparatus 1. The measurement object S is placed on the upper surface of the moving plate 12 of the apparatus 1. The measurement object S is a laminate in which the first specimen S1 and the second specimen S2 are bonded together.

The second specimen S2 of the measurement object S is seated and fixed on the upper surface of the moving plate 12 through the above-described bonding method such as vacuum adsorption or double-sided tape. The end of the first specimen S1 is held by the jig 13*b* of the load applier 13 in a peeled-off state at a peeling start portion of the measurement object S.

FIG. 4B illustrates the process of measuring a load applied when peeling off the first specimen S1 as the sealing strength while peeling off the first specimen S1 from the second specimen S2 constituting the measurement object S.

The first specimen S1 held by the jig 13*b* is peeled off from the second specimen S2 during upward movement of the load applier 13, and the load for pulling the first specimen S1 is measured by the load measuring device 13*a*.

The moving plate 12 is horizontally moved in response to vertical (upward) movement of the load applier 13 so that a holding point P1 of the jig 13*b* and a peeling point P2 of the first specimen S1 are positioned on a straight line. An imaginary straight line connecting the holding point P1 and the peeling point P2 is disposed on a vertical line orthogonal to the upper surface of the moving plate 12.

The end of the first specimen S1 not adhered to the second specimen S2 is held by the jig 13*b*. Then, the load applier 13 applies a load to the first specimen S1 of the measurement object S by moving the end of the first specimen S1 (or the jig 13*b*) upward. The magnitude of the load applied from the load applier 13 is measured through the load measuring device 13*a*. Here, the magnitude of the load applied to the first specimen S1 may be measured as the sealing strength of the measurement object S.

As the load applier 13 is moved upward while holding the first specimen S1, the first specimen S1 is peeled off from the second specimen S2. This vertical movement of the load applier 13 is converted to horizontal movement of the moving plate 12 by peeling off of the first specimen S1. To this end, the moving plate 12 is disposed on the fixed plate 11 to be movable along a peeling direction of the first specimen S1, that is, to be reciprocally linearly movable. Here, the peeling direction means a direction from a peeling start end to a peeling termination end of the measurement object S.

In addition, the peeling direction of the first specimen S1 is set to the direction opposite to a moving direction of the moving plate 12. Thus, the peel test is precisely performed while maintaining the peeling angle β of the first specimen S1 adhered to the second specimen S2 at 90°.

Figure 5:
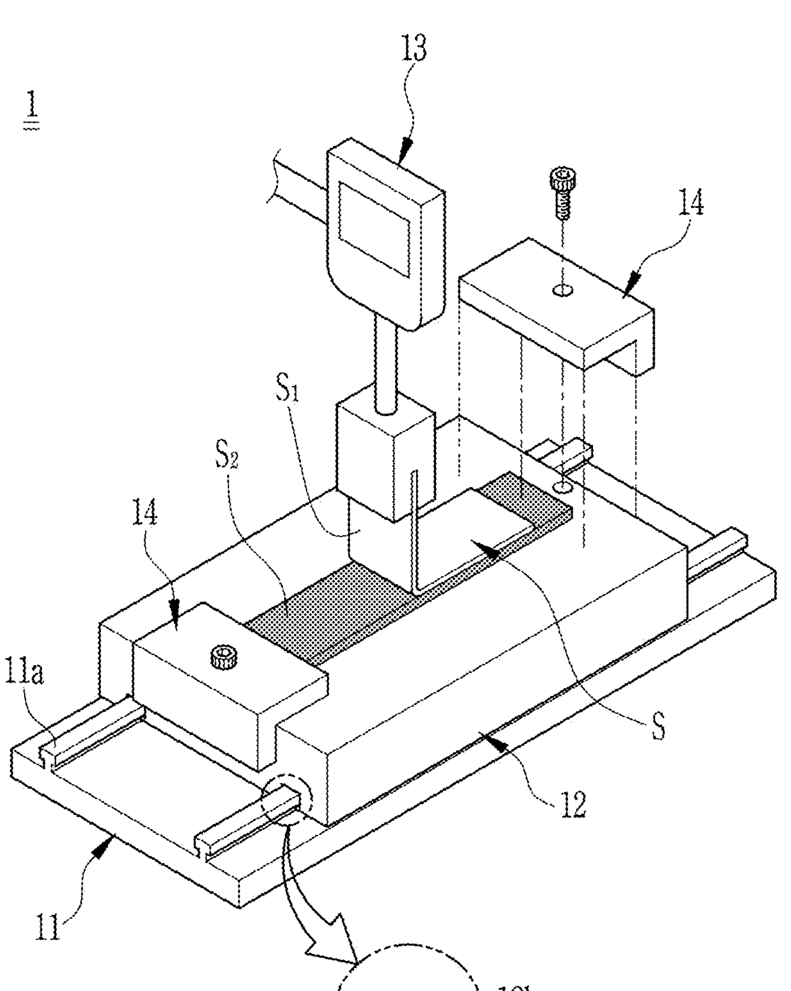
FIG. 5 is a perspective view schematically illustrating an apparatus for measuring sealing strength according to another embodiment of the present disclosure.

FIG. 5 is a perspective view schematically illustrating an apparatus 1 for measuring sealing strength according to another embodiment of the present disclosure. The apparatus 1 illustrated in FIG. 5 is a modified example of the apparatus 1 according to the present disclosure illustrated in FIG. 3 and they have a very similar structure except for a coupling method between the fixed plate 11 and the moving plate 12. Thus, descriptions of similar or identical configurations will be omitted herein for a clear understanding of the present disclosure.

The apparatus 1 for measuring sealing strength according to the other embodiment of the present disclosure includes a fixed plate 11, a moving plate 12 coupled to and disposed on the fixed plate 11 to be slidably movable in the horizontal direction, a load applier 13 for applying a load to a measurement object S fixed to the moving plate 12, and a clamp 14 for clamping or unclamping the measurement object S.

The fixed plate 11 is provided with a guide rail 11*a* extending linearly on an upper surface thereof. Correspondingly, the moving plate 12 has a rail groove 12*b* corresponding to the guide rail 11*a* on a lower surface thereof. As illustrated, as the guide rail 11*a* is inserted into the rail groove 12*b*, the moving plate 12 is coupled to the fixed plate 11 so as to be slidably horizontally moved on the fixed plate 11 along an extending direction of the guide rail 11*a*.

While allowing sliding movement of the moving plate 12 relative to the fixed plate 11 as described above through an insertion engagement between the guide rail 11*a* and the rail groove 12*b*, the apparatus 1 according to the other embodiment of the present disclosure prevents upward separation of the moving plate 12 from the fixed plate 11 even when an external force, for example, a load (tensile force) required to peel off a first specimen S1 is applied.

In addition, a peeling direction of the first specimen S1 is set to the same direction as a moving direction of the moving plate 12 so that the first specimen S1 adhered to a second specimen S2 is peeled off from the second specimen in the peeling direction. To this end, the guide rail 11*a* and the rail groove 12*b* extend along the peeling direction of the first specimen S1.

In addition, the apparatus 1 according to the other embodiment of the present disclosure includes the clamp 14 provided on the moving plate 12 to clamp or unclamp the measurement object S.

As illustrated, the measurement object S is clamped by a pair of clamps 14 disposed spaced apart from each other on opposite sides of the moving plate 12, respectively. The pair of clamps 14 are spaced mirror symmetrically along the peeling direction of the first specimen S1 and/or the moving direction of the moving plate 12, and clamp opposite ends of the measurement object S. One of the pair of clamps 14 is detachably provided at a front side of the moving plate 12 in a shape bent from a side surface to an upper surface of the moving plate 12 so as to be in close contact with an outer surface of a front edge of the moving plate 12, and presses and fixes a peeling start end of the measurement object S, more specifically, an end of the second specimen S2 where peeling begins at the interface between the first specimen S1 and the second specimen S2. Correspondingly, the other of the pair of clamps 14 is detachably provided at a rear side of the moving plate 12 in a shape bent from a side surface to the upper surface of the moving plate 12 so as to be in close contact with an outer surface of a rear edge of the moving plate 12, and presses and fixes a peeling termination end of the measurement object S. By means of the clamps 14, a thin measurement object is unfolded and mounted in a taut state on the upper surface of the moving plate 12.

As illustrated, each of the clamps 14 may be coupled to and/or detached from the upper surface of the moving plate 12 in a bolting manner, but is not limited thereto, and may be tightly coupled to the upper surface of the moving plate 12 in various manners.

While embodiments of the present disclosure have been described above for the illustrative purposes, it will be understood by those skilled in the art that the disclosure can be modified or changed in various forms without departing from the technical spirit of the disclosure.

Simple modifications or changes of the present disclosure belong to the scope of the present disclosure, and the detailed scope of the present disclosure will be more clearly understood by the accompanying claims.

What is claimed is:

1. An apparatus for measuring sealing strength, the apparatus comprising:

a fixed plate;

a moving plate on which a measurement object formed by bonding first and second specimens is mounted, the moving plate being horizontally movable on the fixed plate in response to a vertical movement of a load applier gripping the first specimen;

the load applier measuring a load applied to the first specimen to peel off the first specimen from the second specimen; and a clamp provided on the moving plate in a bent shape and configured to clamp or unclamp the measurement object, wherein the clamp comprises a pair of clamps that are disposed spaced apart from each other and arranged symmetrically along a peeling direction of the first specimen so as to clamp opposite ends of the measurement object, wherein the first specimen is peeled off from the second specimen while maintaining a predetermined peeling angle.

2. The apparatus of claim 1, wherein the moving plate is disposed on the fixed plate to be movable in a horizontal direction.

3. The apparatus of claim 1, wherein the load applier is disposed above the moving plate to be movable in a vertical direction.

4. The apparatus of claim 1, wherein the load applier comprises:

a load measuring device moved in a vertical direction; and a jig coupled to the load measuring device and holding an end of the first specimen.

5. The apparatus of claim 4, wherein an imaginary straight line connecting a holding point of the jig and a peeling point of the first specimen is orthogonal to an upper surface of the moving plate.

6. The apparatus of claim 1, wherein the fixed plate is provided with a guide rail on an upper surface of the fixed plate, and the moving plate has a rail groove movably coupled to the guide rail on a lower surface of the moving plate.

7. The apparatus of claim 6, wherein the guide rail and the rail groove are oriented along a peeling direction of the first specimen.

8. The apparatus of claim 1, wherein the first specimen is provided as a pouch casing, and the second specimen is provided as an electrode tab.

* * * * *